United States Patent [19]

Kono et al.

[11] 4,445,561

[45] May 1, 1984

[54] LARGE SIZE PNEUMATIC RUBBER TIRE FOR ROUGH ROADS

[75] Inventors: Mitsutsugu Kono, Kodaira; Osamu Inoue, Sayama, both of Japan

[73] Assignee: Bridgestone Tire Company Limited, Tokyo, Japan

[21] Appl. No.: 389,798

[22] Filed: Jun. 18, 1982

[30] Foreign Application Priority Data

Jul. 2, 1981 [JP] Japan .............................. 56-103518

[51] Int. Cl.$^3$ .............................................. B60C 11/00
[52] U.S. Cl. ........................... 152/209 B; 152/209 D; 152/330 R; 152/354 R
[58] Field of Search ............ 152/209 R, 209 D, 209 B, 152/209 WT, 209 NT, 354 R, 330 R, 374; D12/149, 151, 146, 147

[56] References Cited

U.S. PATENT DOCUMENTS 3,584,670 6/1971 Verdier ............................ 152/209 R
3,939,890 2/1976 Abe .................................. 152/209 B

*Primary Examiner*—William A. Powell
*Assistant Examiner*—Thomas Bokan
*Attorney, Agent, or Firm*—Sughrue, Mion, Zinn, Macpeak and Seas

[57] ABSTRACT

A large size pneumatic rubber tire for bad or rough roads comprises a number of main grooves in a tread of the tire arranged on both sides of a center circumferential line of the tread and in parallel with one another substantially equally oblique to the center circumferential line and a number of auxiliary grooves in the tread substantially in parallel with one another oblique in a direction opposite to the direction of the main grooves to connect the two main grooves adjacent in a circumferential direction. The main and auxiliary grooves have comparatively wide groove widths, respectively, and divide the tread into a center zone and two size zones. These zones respectively consist of circumferentially arranged respectively substantially same shaped center blocks and side blocks defined by the main and auxiliary grooves. The tire according to the invention can effectively eliminate extraordinary temperature rise in the tire without sacrificing the required performances such as wear-resistance, even if under severe operating conditions.

11 Claims, 3 Drawing Figures

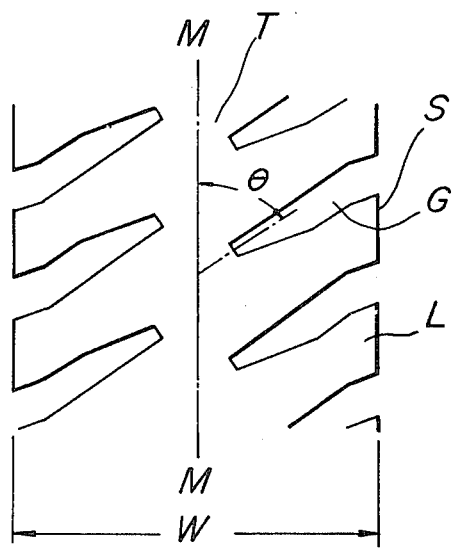
FIG_1
*PRIOR ART*
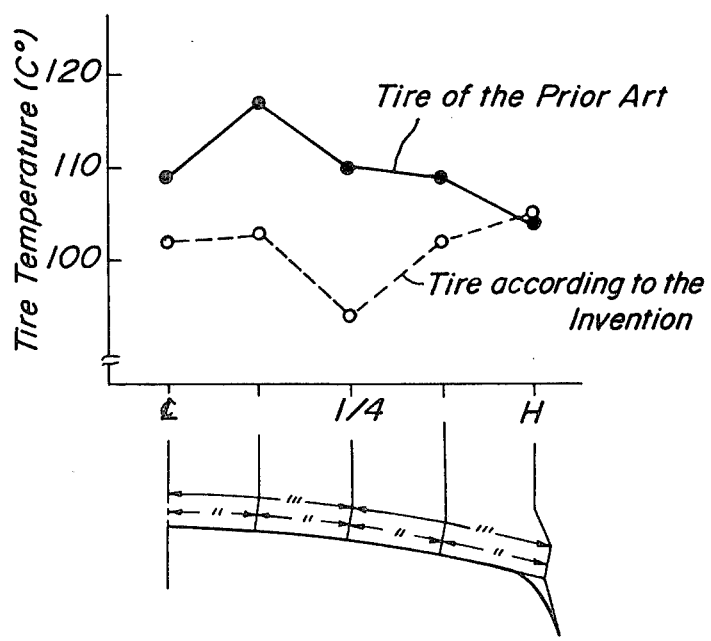
FIG_2

LARGE SIZE PNEUMATIC RUBBER TIRE FOR ROUGH ROADS

BACKGROUND OF THE INVENTION

1. Field of the Invention

This invention relates to a large size pneumatic rubber tire suitable for use in bad or rough roads. More particularly it relates to an improved tire adapted to be used in severe operating conditions as in earth-moving and construction vehicles and the like.

2. Description of the Prior Art

For such applications, in general, bias-structured tires have been mainly used, which include a bias carcass of multiple layer plies as a main reinforcement and a lug or block pattern tread in a rubber crown. In designing such a tire, the tread is made thicker from its center to tread edges in order to fulfill required cut-resistance, wear-resistance, heat-resistance and the like which are contradictory to one another. Troubles, particularly separation, due to heating derived from traveling of tires would occur in the proximity of shoulders which are thickest. In order to prevent such troubles, there have been proposed various solutions which, however, do not provide satisfactory results.

Depending upon requirements of utilization the tires have been obliged to operate in considerably severe conditions. For example, they are often used with high inner pressure for supporting heavy loads and at high speeds to obtain high operating efficiency. It has been found that the temperature in the tire under such a severe condition rises higher particularly between its center circumferential line and a location one fourth of a tread width therefrom than in shoulders. Hitherto known tread patterns cannot overcome the above heating of tires, and cannot fulfill the requirements of the wear-resistance, irregular wear-resistance and groove bottom crack-resistance.

SUMMARY OF THE INVENTION

It is a principal object of this invention to provide a large size pneumatic rubber tire for rough roads, which eliminates the above disadvantages of the prior art and fulfills the requirements of wear-resistant, irregular wear-resistant and groove bottom crack-resistant properties without any temperature rise in the zone from the center circumferential line to the location one fourth of a tread width therefrom. This invention is applicable to a bias tire reinforced by a multiple layer bias carcass.

In order to achieve the object of this invention, a large size pneumatic rubber tire for rough roads according to the invention comprises a number of main grooves formed in a tread of the tire arranged in parallel with one another uniformly oblique in the same direction to and on both sides of a center circumferential line of the tread and opening at said tread and shoulder. A number of auxiliary grooves are formed in the tread arranged substantially in parallel with one another oblique in a direction opposite to the direction of said main grooves with respect to the center circumferential line to connect said main grooves adjacent in a circumferential direction and opening at said tread. These main and auxiliary grooves have comparatively wide groove widths, respectively, and divide the tread into a center zone and two side zones, and these zones respectively consisting of circumferentially arranged respectively substantially same shaped center blocks and side blocks defined by said main and auxiliary grooves.

In a preferred embodiment of the invention, a width of the center zone is 25–63% of a width of the tread and a width of the side zones is substantially half of the remain of the width of the tread.

In accordance with another embodiment of the invention the side blocks have a circumferential length along tread edges, which is 120–210% of opening length of the main grooves defining the side blocks along the tread edges and 13–23% of a width of the tread.

The main grooves preferably have a width gradually diverging towards tread edges.

Preferably, the main grooves are arranged oblique at an angle of 40°–70° to the center circumferential line of the tire and the auxiliary grooves are arranged oblique at an angle of 40°–70° to the center circumferential line.

In another preferred embodiment of the invention, the auxiliary grooves include auxiliary grooves having between the main grooves in both the side zones narrower groove portions having a width narrower than that of the auxiliary grooves connecting the main grooves adjacent in the side zones.

In accordance with a further embodiment of the invention, the auxiliary grooves have the maximum width which is 55–75% of an opening length of the main grooves along tread edges of the tire, and the auxiliary grooves have a depth which is 45–55% of a depth of the main grooves measured at a location one fourth of a width of the tread from a tread edge.

In order that the invention may be more clearly understood, preferred embodiments will be described, by way of example, with reference to the accompanying drawings.

BRIEF DESCRIPTION OF THE DRAWINGS

FIG. 1 is a partial development view of a typical tread pattern of a large size pneumatic rubber tire of the prior art;

FIG. 2 is a graph illustrating distributions of inner temperature caused by heating of treads of the prior art and according to the invention.

DETAILED DESCRIPTION OF THE PREFERRED EMBODIMENT

Figure 3:
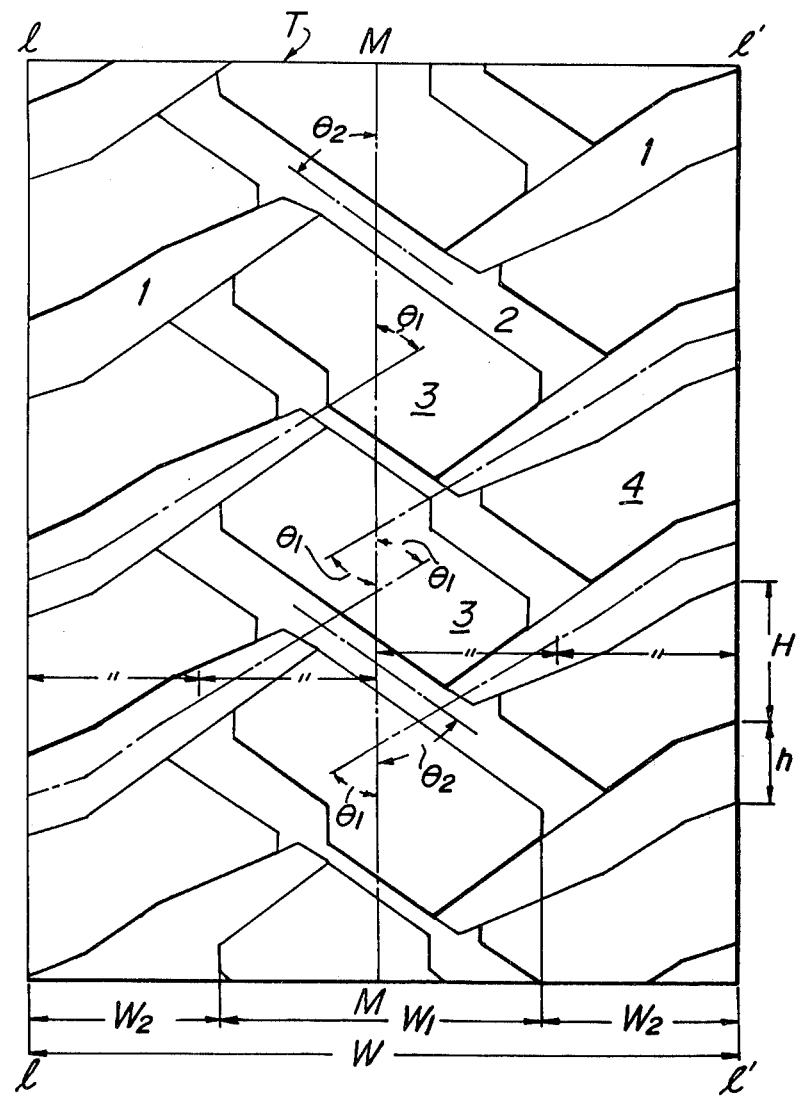
FIG. 3 is a partial development view of a tread of a preferred embodiment of the invention.

FIG. 1 is a development view of a tread pattern applied to a large size bias tire to be used on bad or rough roads, which is generally referred to as a "lug-type" tire. The tread T includes a number of main grooves G respectively opening at the tread surface and shoulders S and arranged in parallel with one another and oblique in substantially the same direction relative to and on both sides of a center circumferential line M—M of the tire to form lugs defined between the adjacent main grooves G. The main grooves G are oblique to the center circumferential line M—M at an angle $\theta$ usually 40°–70°. The main grooves on one hand stop short of the center circumferential line M—M and on the other hand extend slightly diverging towards the shoulders S at which they have opening widths along the shoulders approximately 10% of a tread width W of the tire.

In order to clarify distributions of tire temperature in tread widths, such bias tires were tested rolling on a drum which was able to bring them under operating conditions the same as those at their main applications where they are subjected to high loads at high speeds on rough roads. It has been found from results of the experiments that there are peaks of temperature in tread portions rather near the tread center of the tires as shown in solid lines in FIG. 2.

Further investigations with experiments were repeatedly effected for the purpose of making uniform the uneven temperature distribution in the tire which is particularly higher at the location near the tread center. As the result, it has been found that the following tread pattern as shown in FIG. 3 is suitable for this purpose.

Referring to FIG. 3, a tread of a tire according to the invention includes main grooves 1 substantially the same as the main grooves shown in FIG. 1 and auxiliary grooves 2 oblique to a center circumferential line M—M in a direction opposite to the oblique direction of the main grooves. The auxiliary grooves are continuous to the two main grooves adjacent to each other in circumferential directions of the tire and are opening at a surface of the tread T.

The main and auxiliary grooves 1 and 2 having comparatively wide widths divide the tread T into a center zone $W_1$ and two side zones $W_2$. The respective center and side zones include center blocks 3 and side blocks 4 which are defined by the main and auxiliary grooves in respectively substantially identical shapes and in respectively circumferentially aligned.

The side blocks 4 preferably have along tread edges a circumferential length H which is 120–210% of the opening length h of the main grooves 1 along the tread edges and 13–23% of a tread width W. A circumferential length H of the side blocks 4 less than the above value is apt to cause undesirable irregular wear to adversely affect the service life of the tire. On the other hand, a circumferential length H more than the above value tends to decrease the heat radiating effect at the shoulders.

The main grooves 1 have a width progressively slightly diverging towards the tread edges. The auxiliary grooves 2 may include, between the main grooves in the side zones, narrower grooves portions than those connecting the main grooves adjacent in the circumferential direction. When the oblique angles of these main and auxiliary grooves 1 and 2 to the center circumferential line M—M are less than 40°, irregular wear referred to as "heel and toe" wear tends to occur. On the other hand, the oblique angles more than 70° decrease the groove bottom crack-resistant property and traction performance.

Moreover, the auxiliary grooves 2 preferably have the maximum groove width 55–75% of the opening length of the main grooves 1 along the tread edges. When the maximum groove width is narrower than the above value, the lowering the inner temperature in the proximity of the tread center cannot be accomplished. On the other hand, a wider auxiliary groove width exceeding the above value is disadvantageous for the service life of the tire and its cut-resistance.

Furthermore, auxiliary groove depth is preferably 45–55% of the main groove depth measured at a location one fourth of the tread width from the tread edge. When the auxiliary groove depth is less than the above value, the auxiliary grooves do not serve to lower much the inner temperature in the proximity of the tread center. On the other hand, a deeper auxiliary groove depth than the above value is apt to decrease the groove bottom crack resistance and service life of the tire.

With the large size pneumatic rubber tire, OR-3600-51, 58PR for rough roads shown in FIG. 3, it has 60° of the angle $\theta_1$ of the main grooves to the center circumference M—M, 55° of the angle $\theta_2$ of the auxiliary grooves to the center circumference M—M, 855 mm of the tread width W, approximately 400 mm of the center zone width $W_1$, approximately 227.5 mm of the side zone width $W_2$, 92 mm of the opening length h of the main grooves along the tread edges, 151 mm of the circumferential length H of the blocks along the tread edges, 80 mm of the main groove depth at the location one fourth of the tread width from the tread center and 40 mm of the auxiliary groove depth.

The tires having such dimensions embodying the invention were tested on heating under the same conditions as those of above tests, whose results are shown in dash lines in FIG. 2 in comparison with the lines of the prior art. As can be seen from the results, the effect of restraining the heating is remarkably noticed in the intermediate area between the tread center and the tread edge, and the proximity of the intermediate area, particularly near to the center tread to accomplish the object of the invention. A vehicle, EUCLID R170 was equipped with the tires shown in FIG. 3 to be tested on an actual running test in which any heel and toe wear and groove crack were not found in the treads of the tires.

The large size pneumatic tire for rough roads according to the invention can effectively eliminate the extraordinary temperature rise in the tire which would otherwise be anxiously expected, without adversely affecting the wear-resistance, irregular wear-resistance and groove bottom crack-resistance, even if the tires are operated at high speeds under severe conditions.

It is further understood by those skilled in the art that the foregoing description is that of preferred embodiments of the disclosed tires and that various changes and modifications may be made in the invention without departing from the spirit and scope thereof.

What is claimed is:

1. A large size pneumatic rubber tire for rough roads comprising; a number of main grooves formed in a tread of the tire arranged in parallel with one another uniformly oblique in the same direction to and on both sides of a center circumferential line of the tread and opening at said tread and shoulders, a number of auxiliary grooves formed in the tread arranged substantially in parallel with one another oblique in a direction opposite to the direction of said main grooves with respect to the center circumferential line of said tire of connect said main grooves adjacent in a circumferential direction and opening at said tread, said main and auxiliary grooves having comparatively wide groove widths, respectively, and dividing said tread into a center zone and two side zones, said zones respectively consisting of circumferentially arranged respectively same shaped center blocks and side blocks defined by said main and auxiliary grooves, and side blocks having a circumferential length along tread edges, which is 120–210% of opening length of said main grooves defining said side blocks along said tread edges and 13–23% of a width of said tread.

2. A tire as set forth in claim 1, wherein said main grooves are arranged oblique at an angle of 40°–70° to said center circumferential line of the tire.

3. A tire as set forth in claim 1, wherein said auxiliary grooves include auxiliary grooves having between said main grooves in both said side zones narrower groove portions having a width narrower than that of the auxiliary grooves connecting said main grooves adjacent in said side zones.

4. A tire as set forth in claim 1, wherein said auxiliary grooves have the maximum width which is 55-75% of an opening length of said main grooves along tread edges of the tire.

5. A large size pneumatic rubber tire for rough roads comprising; a number of main grooves formed in a tread of the tire arranged in parallel with one another uniformly oblique in the same direction to and on both sides of a center circumferential line of the tread and opening at said tread and shoulders, said main grooves having a width gradually diverging towards said tread edges, a number of auxiliary grooves formed in the tread arranged substantially in parallel with one another oblique in a direction opposite to the direction of said main grooves with respect to the center circumferential line of said tire to connect said main grooves adjacent in a circumferential direction and opening at said tread, said main and auxiliary grooves having comparatively wide grooves widths, respectively, and dividing said tread into a center zone and two side zones, and said zones respectively consisting of circumferentially arranged respectively same shaped center blocks and side blocks defined by said main and auxiliary grooves.

6. A large size pneumatic rubber tire for rough roads comprising: a number of main grooves formed in a tread of the tire arranged in parallel with one another uniformly oblique in the same direction to and on both sides of a center circumferential line of the tread and opening at said tread and shoulders, a number of auxiliary grooves formed in the tread arranged substantially in parallel with one another oblique in a direction opposite to the direction of said main grooves and arranged at an angle of 40°-70° with respect to the center circumferential line of said tire to connect said main grooves adjacent in a circumferential direction and opening at said tread, said main and auxiliary grooves having comparatively wide groove widths, respectively, and dividing said tread into a center zone and two side zones, and said zones respectively consisting of circumferentially arranged respectively same shaped center blocks and side blocks defined by said main and auxiliary grooves.

7. A large size pneumatic rubber tire for rough roads comprising; a number of main grooves formed in a tread of the tire arranged in parallel with one another uniformly oblique in the same direction to and on both sides of a center circumferential line of the tread and opening at said tread and shoulders, a number of auxiliary grooves formed in the tread arranged substantially in parallel with one another oblique in a direction opposite to the direction of said main grooves with respect to the center circumferential line of said tire to connect said main grooves adjacent in a circumferential direction and opening at said tread, said main and auxiliary grooves having comparatively wide groove widths, respectively, and dividing said tread into a center zone and two side zones, said zones respectively consisting of circumferentially arranged respectively same shaped center blocks and side blocks defined by said main and auxiliary grooves, and said auxiliary grooves have a depth which is 45-55% of a depth of said main grooves measured at a location one fourth of a width of said tread from a tread edge.

8. A tire as set forth in claims 1, 5, 6 or 7, wherein a width of said center zone is 25-63% of a width of said tread and a width of each of said side zones is substantially half of the remain of the width of the tread.

9. A tire as set forth in claim 5, wherein said main grooves are arranged oblique at an angle of 40°-70° to said center circumferential line of the tire.

10. A tire as set forth in claim 5, wherein said auxiliary grooves include auxiliary grooves having between said main grooves in both said side zones narrower groove portions having a width narrower than that of the auxiliary grooves connecting said main grooves adjacent in said side zones.

11. A tire as set forth in claim 5, wherein said auxiliary grooves have the maximum width which is 55-70% of an opening length of said main grooves along tread edges of the tire.

* * * * *